(12) United States Patent
Hermann et al.

(10) Patent No.: US 7,688,503 B2
(45) Date of Patent: Mar. 30, 2010

(54) MICROSCOPY SYSTEM AND MICROSCOPY METHOD FOR PLURAL OBSERVERS

(75) Inventors: Karlheinz Hermann, Aalen (DE); Frank Rudolph, Aalen (DE); Martin Schneider, Koenigsbronn (DE); Joachim Steffen, Westhausen (DE); Michael Wirth, Aalen (DE)

(73) Assignee: Carl Zeiss Stiftung, Heidenheim (DE)

( * ) Notice: Subject to any disclaimer, the term of this patent is extended or adjusted under 35 U.S.C. 154(b) by 0 days.

(21) Appl. No.: 10/664,893

(22) Filed: Sep. 22, 2003

(65) Prior Publication Data

US 2004/0105147 A1 Jun. 3, 2004

(30) Foreign Application Priority Data

Sep. 20, 2002 (DE) ............................... 102 43 852

(51) Int. Cl.
*G02B 21/18* (2006.01)
(52) U.S. Cl. .................. 359/374; 359/368; 359/372
(58) Field of Classification Search ................. 359/368, 359/372, 374–376
See application file for complete search history.

(56) References Cited

U.S. PATENT DOCUMENTS

| | | | |
|---|---|---|---|
| 5,002,376 A * | 3/1991 | Hoppl et al. ................. 359/377 |
| 5,052,789 A | 10/1991 | Kleinberg | |
| 6,005,710 A | 12/1999 | Pensel et al. | |
| 6,088,154 A | 7/2000 | Morita | |
| 6,327,079 B1 | 12/2001 | Namii et al. | |
| 6,483,948 B1 | 11/2002 | Spink et al. | |
| 6,661,572 B2 * | 12/2003 | Spink et al. ................. 359/372 |
| 6,765,718 B1 | 7/2004 | Spink et al. | |
| 2001/0024319 A1 | 9/2001 | Hauger et al. | |
| 2001/0050808 A1 | 12/2001 | Morita et al. | |
| 2003/0112509 A1 | 6/2003 | Takahashi | |

FOREIGN PATENT DOCUMENTS

| | | |
|---|---|---|
| DE | 41 34 481 A1 | 4/1993 |
| DE | 199 11 145 A1 | 9/1999 |
| EP | 1 235 094 A2 | 8/2002 |
| JP | 11258516 A | 9/1999 |
| WO | WO96/20421 A1 | 7/1996 |
| WO | WO 96/20421 A1 | 7/1996 |
| WO | WO98/13716 A1 | 4/1998 |
| WO | WO 00/68724 A1 | 11/2000 |
| WO | WO 01/27659 A2 | 4/2001 |

* cited by examiner

*Primary Examiner*—Joshua L Pritchett
(74) *Attorney, Agent, or Firm*—Potomac Patent Group PLLC

(57) ABSTRACT

A microscopy system allows to superimpose a light optically generated microscopic image of an object with an electronically generated image. The electronically generated image is composed of two input images, one of which is independent of optical settings of an ocular tube, such as a rotational position and a magnification thereof, and the other input image is dependent of the optical setting.

17 Claims, 1 Drawing Sheet

MICROSCOPY SYSTEM AND MICROSCOPY METHOD FOR PLURAL OBSERVERS

FIELD OF THE INVENTION

The present invention relates to a microscopy system and a microscopy method for plural observers.

In particular, the present invention relates to a stereomicroscope, such as a surgical microscope, for plural observers, or a microscope for plural observers which may be used for different purposes such as applications in material sciences.

BACKGROUND OF THE INVENTION

From U.S. Pat. No. 6,327,079 B1 there is known a surgical microscope having separate ocular systems for two observers wherein respective oculars may be pivoted or rotated about an optical axis of an objective lens of the microscope.

There is an increasing demand for superimposing an electronically generated image with an image generated with the optical beam path of such microscopes. A problem encountered in some conventional applications is a lack of correct registration of the light optically generated microscopic image with respect to the superimposed electronically generated image.

SUMMARY OF THE INVENTION

Accordingly, it is an object of the present invention to provide a microscopy system and a microscopy method allowing an improved registration of the light optically generated microscopic image with respect to the electronically generated image.

The invention provides a microscopy system for observing an object which may be positioned in an object plane of the microscopy system, wherein the system comprises at least one objective lens arrangement for receiving a beam on an object side of the objective lens and emanating from the object plane, and for transforming the beam of the object side into a beam on an image side of the objective lens. The system comprises plural ocular systems each having at least one ocular tube for generating plural respective images of the object plane for plural observers, and wherein an image projector having a display is provided for superimposing an image of the display with a beam path of the ocular system such that the image of the object plane is perceived by the respective observer superimposed with the image of the display. At least one optical setting of a first ocular system among the plural ocular systems may be adjusted independently of a corresponding optical setting of a second ocular system among the plural ocular systems. A controller is provided for generating the image displayed by the display, wherein the controller is configured to generate the displayed image from a first input image based on the at least one optical setting of the first ocular system.

With such system the observer may change the optical setting of the first ocular system, and the system will adapt the generation of the electronically generated image such that both the optically generated image and the electronically generated image are superimposed with each other as intended.

According to a first embodiment the at least one ocular tube of the first ocular system is rotatable about an optical axis of the objective lens arrangement, and the controller is configured to generate the displayed image from the first input image by rotating the first input image by an image rotation angle determined on the basis of an angular position of the ocular tube about the optical axis.

According to a second embodiment the ocular system comprises a zoom system for changing a magnification of the optical image of the object plane, and the controller is configured to generate the electronically generated image displayed by the display from the first input image by scaling the first input image by a scale factor determined in dependence of the magnification of the zoom system.

The first input image may be an image having a direct correspondence with the observed object. For example, the first input image may be an image obtained by a further image generating method, such as a computer tomographic (CT) method, a magnetic resonance tomographic (NMR) method, and a fluorescence imaging method. The first input image may be previously generated from such three-dimensional tomographic data while taking into account a position of the microscope relative to the object under examination. It is then possible to adapt such input image to the present configuration of the optics for light optical observation of the object. Such present configuration may involve different settings of the rotational position of the ocular tube which the observer uses to observe the object or a currently used magnification of the zoom system of the ocular tube used by the observer.

The first input image has the correspondence to the light optically generated image in that structures and topologies of the light optically generated image correspond to structures and to topologies of the first input image. For example, the first input image may represent a periphery of a structure, such as a blood vessel or a tumour tissue, with a high contrast, wherein the blood vessel or tumour tissue is contained in the light optically generated image with a lower insufficient contrast.

According to a further embodiment a second input image is superimposed with the light optically generated image wherein the second input image is independent of the at least one optical setting of the first ocular system, such as the setting of the angular position of the ocular tube about the optical axis of the objective lens or the magnification of the zoom system. The second input image may be an image representing suitable data of interest for the observer, such as information on a blood pressure of a patient under surgery, or others. Such data should be visible to the observer always in a same manner and independent of the optical setting of the ocular system.

The second input image does not directly correspond to the light optically generated image in that structures and topologies of the second input image do not correspond to structures and topologies of the light optically generated image. The second input image thus represents information which is preferably not in direct correspondence with the light optically generated image. The second input image may represent data numerically or as a bar diagram or some other graphical representation.

The invention further provides a microscopy method for displaying a magnified image of an object plane for plural observers, wherein the method comprises: light optically generating the images of the object plane with plural optics, wherein a first optics of the plural optics has at least one optical parameter which may be adjusted independently from corresponding optical parameters of the other optics; electronically generating at least one representation from a first input image based on the at least one adjustable optical parameter; and superimposing an image of the electronically generated representation with the image of the light optically generated image generated with the first optics.

According to an embodiment of the microscopy method, at least a portion of the first optics may be rotated about an axis, and the electronical generation of the at least one representation comprises rotating the representation in dependence on an angular position of the portion of the first optics about the axis.

According to a further embodiment of the method, the electronical generation comprises scaling of the representation in dependence on a magnification of the first optics.

BRIEF DESCRIPTION OF THE DRAWINGS

Embodiments of the invention will be illustrated herein below with reference to FIG. 1 showing a schematic representation of an embodiment of a microscopy system according to the present invention.

DETAILED DESCRIPTION OF PREFERRED EMBODIMENTS

Figure 1:
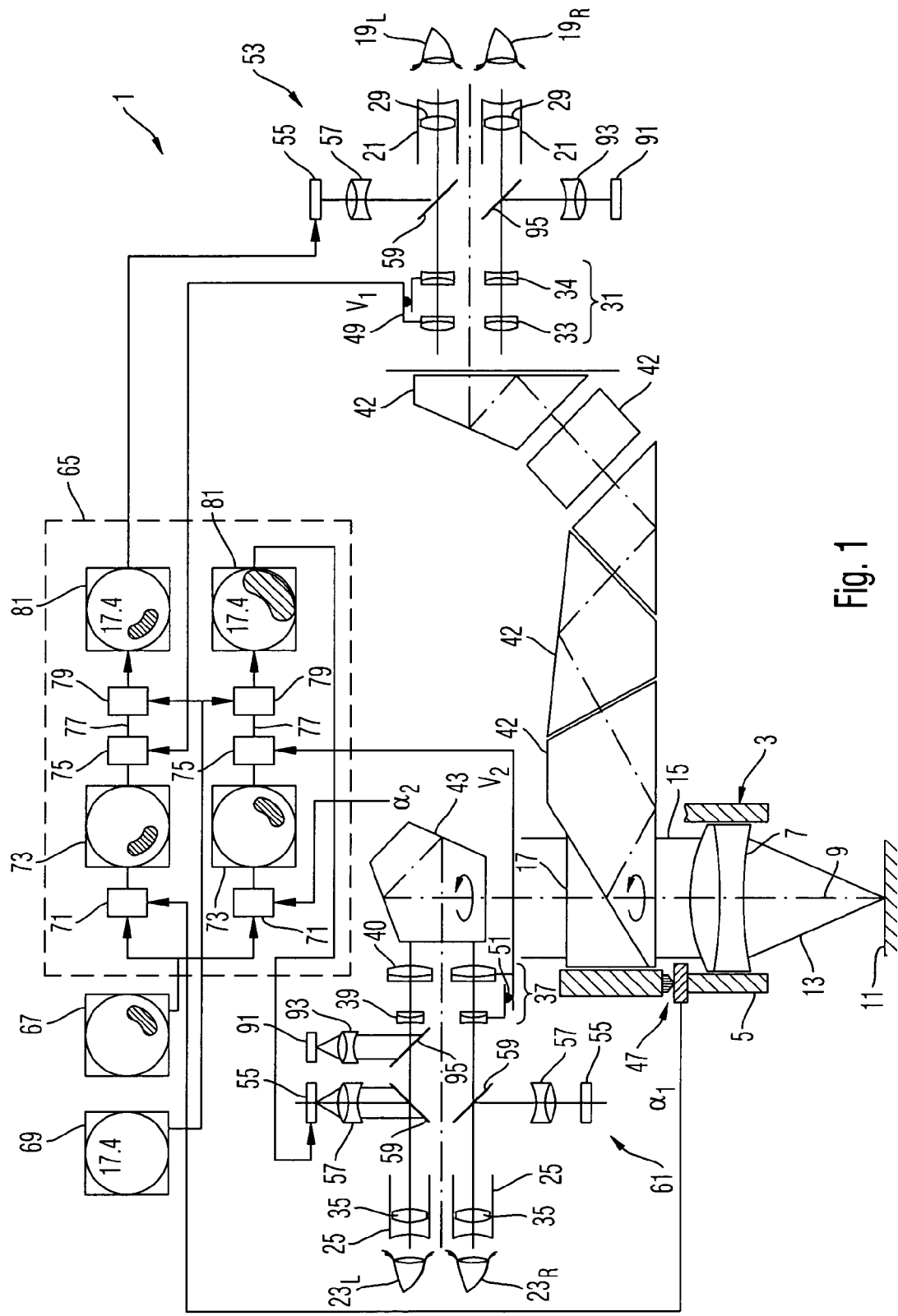

FIG. 1 shows a schematic illustration of a microscopy system 1 having an objective lens system 3 including a lens system 7 and a housing 5 thereof. The lens system 7 has an optical axis 9 and receives an object side beam 13 emanating from an object plane 11 and transforms the object side beam 13 into an image side beam 15 which is a parallel beam in the embodiment shown in FIG. 1. However, the image side beam 15 may be also a non-parallel beam.

A beam dividing prism 17 is disposed in the image side beam 15 for splitting the image side beam 15 for two observers:

A first observer having a left eye 19L and a right eye 19R looks into a binocular tube 21 for perceiving a magnified image of the object plane 11, and a second observer having a left eye 23L and a right eye 23R looks into a binocular tube 25 for also perceiving a magnified image of the object plane 11.

The ocular tube 21 comprises two single tubes each having an ocular 29 and a zoom system 31 including two zoom lenses 33 and 34 which are displaceable with respect to each other for changing the magnification.

Similarly, the binocular tube 25 comprises two single tubes each including an ocular 35 and a zoom system 37 having zoom lenses 39 and 40 which are displaceable with respect to each other for change of magnification.

In a beam path between beam dividing prism 17 and the binocular tube 21 plural prisms 32 are provided for guiding the divided image side beam 15 to the binocular tube 21 and for allowing further rotations of the oculars 29 about beam 15 in a conventional manner.

In a beam path between the beam dividing prism 17 and the other binocular tube 25 prisms such as image reversing prism 43 are provided. The beam dividing prism 17 is rotatable about optical axis 9 with respect to the objective housing 5 such that the first observer with his eyes 19L, 19R may change his position about the optical axis 9. A position sensor 47 is provided for determining an angular position $\alpha 1$ of the beam dividing prism 17 relative to the objective housing 5.

Similarly, the prism 43 is rotatable about the optical axis 9, and a position sensor not shown in FIG. 1 for simplicity is also provided for detecting an angular position $\alpha 2$ of the prism 43 about optical axis 9.

A displacement sensor 49 is provided for detecting an adjusted magnification $V_1$ of the zoom system 31 as a function of a distance between the two zoom lens components 33 and 34. A corresponding displacement sensor 51 associated with the other zoom system 37 is provided for detecting a magnification $V_2$ to which zoom system 37 is adjusted.

An image projector 53 is provided in the beam path of the first observer for coupling an electronically generated image into the beam path to the left eye 19L of the first observer and for superimposing the electronically generated image with the light optically generated image of the object plane. The light optically generated image is formed by the optical components 7, 17, 42, 31 and 29 illustrated above. The image projector 53 comprises an LCD-display 55, an adapter optics 57 and a semi-transparent mirror 59 mounted on tube 21.

Similarly, an image projector 61 is provided in the beam path for the second observer, wherein image projector 61 comprises a pair of projectors such that an electronically generated image is supplied to both eyes 23L and 23R of the second observer. Image projector 61 comprises a pair of LCD-displays 55, a pair of adapter optics 57 and a pair of semi-transparent mirrors 59 mounted on tube 25.

A controller 65 is provided for generating the images to be displayed by the image projectors 53 and 61. The controller is to generate the electronically generated images for image projectors 53 and 61, respectively, such that the superposition of the respective electronically generated images is in accordance with the light optically generated images perceived by the respective observer. Thus, the generation of the electronically generated images has to be performed while taking the magnifications $V_1$, $V_2$ of the respective zoom systems 31 and 37 into account, and by taking the respective angular positions $\alpha 1$, $\alpha 2$ of the observers about optical axis 9 into account.

The image to be displayed is composed of two components, namely a first input image 67 and a second input image 69. The first input image 67 includes a representation of a structure determined by a computer tomographic (CT) method, such as a tumour tissue which is represented as a kidney-shape in FIG. 1. The second input image 69 comprises a data representation indicating a status of the patient under surgery with the microscopy system 1, such as a blood pressure, a pulse frequency and an oxygen saturation of blood or similar. The data representation is symbolically indicated by the number "17.4" in FIG. 1.

The data representation of the second input image 69 should be perceived by each observer always in a same manner, i.e. in a same size and orientation, and independently of the angular positions $\alpha 1$, $\alpha 2$ about the optical axis 9 of the objective lens 3, and independently of the currently adjusted magnifications $V_1$, $V_2$ of the respective zoom systems 31, 37.

The first input image, however, should be always superimposed with the light optically generated image of the object plane 11 such that the structure of the first input image corresponds to the structure of the light optically generated image, and the displayed first input image is changed when the angular position $\alpha 1$, $\alpha 2$ and magnification $V_1$, $V_2$ have changed. For this purpose, controller 65 comprises for each observer an image rotating unit 71 to which the input image 67 is supplied. Further, the respective angular position $\alpha 1$, $\alpha 2$ detected with the respective position sensor (47) is supplied to the respective image rotating unit 71. The image rotating unit 71 rotates the first input image by the respective rotating angle $\alpha 1$, $\alpha 2$ and outputs the result as a rotated input image 73.

The controller 65 further comprises for each observer an image scaling unit 75 receiving the rotated image 73 as an input, and further receiving the magnification $V_1$, $V_2$ adjusted by the respective observer and detected by position sensors 49 and 51 respectively. The image scaling unit 75 scales the rotated image 73 in dependence of the magnification $V_1$, $V_2$ and outputs the result as a rotated and scaled image 77 which is not separately shown in FIG. 1 for ease of illustration. The rotated and scaled image 77 is supplied to an image combining unit 79. The image combining unit 79 further receives the second input image 69 as an input and superimposes the second input image 69 with the rotated and scaled image 77. The result is outputted as an electronically generated image 81 to be displayed.

The electronically generated images 81 are supplied to the respective LCD-displays 55. The LCD-displays 55 display the electronically generated images 81 such that each observer perceives a superposition of the light optically generated image of the object plane, the second (data) input image 69, and the first input image 67 correctly oriented and scaled to correspond with the optical setting with which the light optically generated image is generated.

With the microscopy system 1 illustrated above it is possible that each observer perceives an electronic representation having a direct correspondence with the observed object correctly oriented and scaled to coincide with the corresponding light optically generated image of the object. The electronic representation which is not in direct correspondence with the light optically generated image, such as a the data "17.4" is perceived always in the same way and independent of the orientation and magnification of the respective binocular tube.

In the embodiment illustrated above the electronically generated representations are superimposed with the beam paths of two observers. It is, however, possible to modify the microscopy system such that a higher number of observers is supplied with both the light optically generated images and the electronically generated images superimposed with correct orientation and scaling. It is further conceivable that only the second input image 69 is displayed to one or plural observers or that only the first input image 67 is displayed to one or plural observers or that only a subset of the plural observers may see both input images 69 and 67.

According to an alternative embodiment an image rotation angle and a scale factor may be determined by a method of image processing rather than by position sensors 47, 49, 51:

For this purposes, the beam paths for each observer comprise a CCD-camera 91, a camera optics 93 and a semi-transparent mirror 95 such that the camera is supplied with and detects an image of the object plane 11 similar to that image perceived by eyes 19R, 19L, 23R, 23L of the observers.

The controller 65 is supplied with an electronic representation of the images detecting by cameras 91, and the controller compares these images with each other. From the comparison of the images the controller 65 may then detect a difference of the magnifications chosen by the observers. From such comparison, the controller may further determine a difference in the angular positions of the respective observers about the optical axis of the objective lens. Thus, the controller may determine the optical settings without mechanical sensors 47, 49, 51 by a mere electronic comparison of images, provided that only one of the magnifications $V_1$ or $V_2$ and one of the angles $\alpha 1$ or $\alpha 2$ are determined by some other method.

In the embodiment illustrated with reference to FIG. 1 the electronically generated image is supplied only to the left eye 19L of the first observer while his other eye 19R is not supplied with an electronically generated image. It is, however, also possible to supply both eyes 19L and 19R of the first observer with electronically generated images as it is illustrated for a beam path of the second observer receiving electronically generated images with his both eyes 23L and 23R.

What is claimed is:

1. A microscopy system for observing an object by plural observers, the system comprising:

at least one objective lens arrangement for receiving an object side beam emanating from an object plane and for transforming the object side beam into an image side beam;

a first ocular system comprising a first ocular tube including a first ocular, and a first image projector including a first display, wherein the first ocular system provides a first beam path from the objective lens arrangement to the first ocular, and a second beam path from the first display to the first ocular, to enable a first observer to observe the object and a first image displayed by the first display in superposition by looking into the first ocular, wherein at least one optical setting of the first ocular system is adjustable;

a second ocular system comprising a second ocular tube including a second ocular, and a second image projector including a second display, wherein the second ocular system provides a third beam path from the objective lens arrangement to the second ocular, and a fourth beam path from the second display to the second ocular, to enable a second observer to observe the object and a second image displayed by the second display in superposition by looking into the second ocular; and a controller configured for processing a first electronic input image in dependence of the at least one optical setting of the first ocular system, for processing a second electronic input image independently of the at least one optical setting of the first ocular system, for combining the processed first and second electronic input images to generate a first electronic output image, and for supplying the first electronic output image to the first display wherein the controller is further configured for processing the first electronic input image and the second electronic input image, for combining the processed first and second electronic input images to generate a second electronic output image, and for supplying the second electronic output image to the second display.

2. The microscopy system according to claim 1, wherein the at least one optical setting of the first ocular system comprises at least one of a setting of an angular position of the first ocular tube about an optical axis of the at least one objective lens arrangement, and a setting of a magnification of a zoom system of the first ocular tube.

3. The microscopy system according to claim 1, wherein the at least one optical setting is continuously variable between a first value and a second value.

4. The microscopy system according to claim 1, wherein at least one optical setting of the second ocular system is adjustable independently of the at least optical setting of the first ocular system, and wherein the controller is further configured for processing the first electronic input image in dependence of the at least one optical setting of the second ocular system, and for processing the second electronic input image independently of the at least one optical setting of the second ocular system, and for combining the processed first and second electronic input images to generate the electronic output image.

5. The microscopy system according to claim 4, wherein the at least one optical setting of the first ocular system comprises at least one of a setting of an angular position of the first ocular tube about an optical axis of the at least one objective lens arrangement, and a setting of a magnification of a zoom system of the first ocular tube.

6. The microscopy system according to claim 5, wherein the at least one optical setting of the second ocular system comprises at least one of a setting of an angular position of the second ocular tube about an optical axis of the at least one objective lens arrangement, and a setting of a magnification of a zoom system of the second ocular tube.

7. The microscopy system according to claim 1, wherein the first ocular system comprises a pair of first ocular tubes to enable the first observer to stereoscopically observe the object.

8. The microscopy system according to claim 1, wherein the second ocular system comprises a pair of second ocular tubes to enable the second observer to stereoscopically observe the object.

9. The microscopy system according to claim 1, wherein the first ocular system comprises a first camera and the second ocular system comprises a second camera, and wherein the controller is configured to determine the at least one optical setting of the first ocular system based on a comparison of an image detected by the first camera with an image detected by the second camera.

10. The microscopy system according to claim 1, wherein the objective lens arrangement has an optical axis, wherein the first ocular tube of the first ocular system is rotatable about the optical axis,
   wherein the at least one optical setting of the first ocular system comprises a rotational position of the first ocular tube about the optical axis, and
   wherein the controller is configured to rotate the first electronic input image by a first image rotation angle determined in dependence of the rotational position of the first ocular tube.

11. The microscopy system according to claim 10, further comprising an angle detector for detecting an angle of the first ocular tube of the first ocular system relative to a housing of the objective lens arrangement, and wherein the controller is configured to determine the first image rotation angle based on the detected angle.

12. The microscopy system according to claim 11, wherein the first ocular system comprises a first camera and the second ocular system comprises a second camera, and wherein the controller is configured to determine the first image rotation angle based on a comparison of an image detected by the first camera and an image detected by the second camera.

13. The microscopy system according to claim 10, wherein the second ocular tube of the second ocular system is rotatable about the optical axis,
   wherein the optical setting of the second ocular system comprises a rotational position of the second ocular tube about the optical axis, and
   wherein the controller is configured to rotate the first electronic input image by a second image rotation angle determined in dependence of the rotational position of the second ocular tube.

14. The microscopy system according to claim 11, wherein the first ocular system comprises a first zoom system for changing a first magnification provided by the first ocular system,
   wherein the at least one optical setting of the first ocular system comprises the first magnification, and
   wherein the controller is configured to scale the first electronic input image with a first scale factor determined in dependence of the first magnification.

15. The microscopy system according to claim 14, further comprising a position sensor for detecting a setting of components of the first zoom system with respect to each other, and
   wherein the controller is configured to determine the first scale factor based on the detected setting.

16. The microscopy system according to claim 14, wherein the first ocular system comprises a first camera and the second ocular system comprises a second camera, and wherein the controller is configured to determine the first scale factor based on a comparison of an image detected the first camera and an image detected by the second camera.

17. The microscopy system according to claim 14, wherein the second ocular system comprises a second zoom system for changing a second magnification provided by the second ocular system,
   wherein the at least one optical setting of the second ocular system comprises the second magnification, and
   wherein the controller is configured to scale the first electronic input image with a second scale factor determined in dependence of the second magnification.

* * * * *